No. 627,389. Patented June 20, 1899.
O. C. CAMPBELL.
POTATO DIGGING ATTACHMENT FOR PLOWS.
(Application filed Nov. 26, 1898.)

(No Model.)

WITNESSES:
Edward Thorpe
Fred Acker

INVENTOR
O. C. Campbell
BY
ATTORNEYS.

THE NORRIS PETERS CO., PHOTO-LITHO., WASHINGTON, D. C.

UNITED STATES PATENT OFFICE.

OLIVER CROMWELL CAMPBELL, OF COLDWATER, MICHIGAN.

POTATO-DIGGING ATTACHMENT FOR PLOWS.

SPECIFICATION forming part of Letters Patent No. 627,389, dated June 20, 1899.

Application filed November 26, 1898. Serial No. 697,544. (No model.)

*To all whom it may concern:*

Be it known that I, OLIVER CROMWELL CAMPBELL, of Coldwater, in the county of Branch and State of Michigan, have invented a new and Improved Potato-Digging Attachment for Plows, of which the following is a full, clear, and exact description.

The object of the invention is to provide a potato-digging device that may be attached to the moldboard of any plow and be substituted for the regular point.

Another object of the invention is to so construct the device that a series of spring tines or fingers, forming a portion of the detachable share or point, will receive the earth, potatoes, and plants thrown up by the plow and effect such a separation of the material that the dirt will be sifted from the potatoes and the potatoes be distributed in rows upon the ground, while the plants will be distributed also upon the surface of the soil, but at a distance from the potatoes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
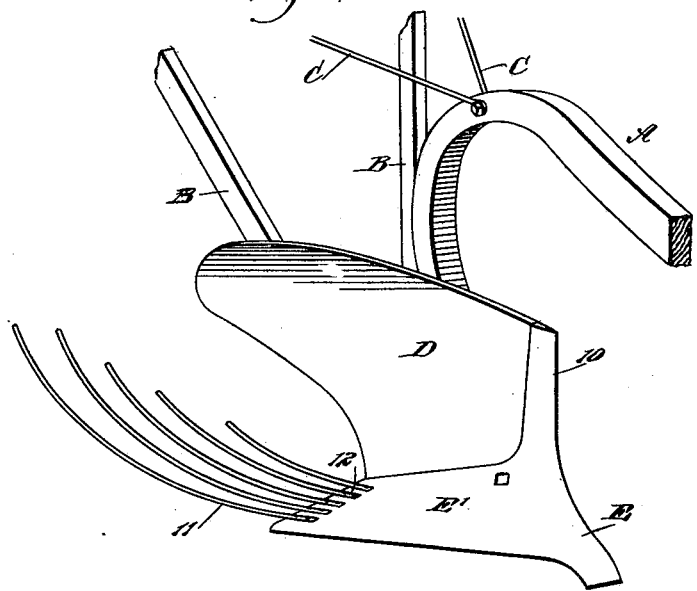
Figure 2:
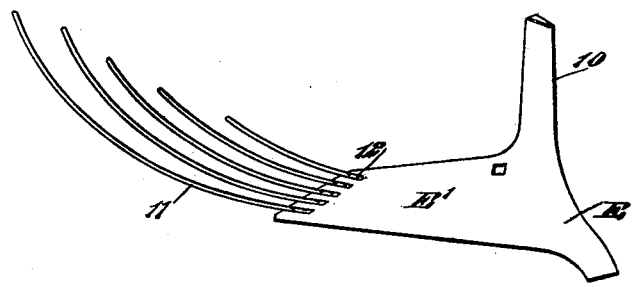

Figure 1 is a perspective view of the improved device applied to the moldboard of a plow in place of the usual share, and Fig. 2 is a detail perspective view of the attachment separated from the plow.

A represents the plow-beam; B, the handles; C, the braces that connect the plow-beam with the handles, and D the moldboard for the plowshare. The moldboard is adapted to receive a point E and share E', the point and share being combined, and the point is provided with the usual upright colter 10, which is located at the forward end of the moldboard. The share E' inclines from the landside in the usual manner or to a greater degree than usual, if required, and the share is made to terminate at the lower edge of the moldboard. At the rear end of the share a series of spring-tines 11 is secured by means of bolts 12 or their equivalents, and preferably the tines are attached to the upper face of the share, as shown particularly in Fig. 2. When the combined share and point are secured to the moldboard, which attachment may be accomplished by any suitable means, the tines will extend longitudinally at one side of the moldboard and opposite the overhanging rear portion thereof, as shown in Fig. 1. The tines are given an upward and rearward inclination and are preferably graduated in length, the tine near the landside being the shortest and the opposite outer tine the longest, and the set of tines is also inclined transversely from the landside of the plow by reason of the same inclination of the share to which the tines are secured—that is, the short tine nearest the landside or nearest the rear portion of the moldboard D will be highest, while the longer tines are located lower.

In operation the combined point and share, the latter carrying the tines, having been attached to the moldboard as the point travels through the soil the potatoes, dirt, and plants will be dug up and directed by the moldboard D to the tines. The tines being of a spring material will be in constant vibration, and consequently the dirt will be separated from the potatoes. The potatoes will roll upon the upper surface of the furrow and will be exposed thereon in rows, while the plants will gradually work toward the end of the tines and be delivered on the surface of the soil at such distance from the potatoes that the plants will not interfere with the gathering of said potatoes.

The device may be attached to the moldboard of any plow, and it is evident that the device is simple, durable, and effective and that the attachment will obviate the necessity of purchasing a machine especially designed for digging potatoes.

Having thus described my invention, I claim as new and desire to secure by Letters Patent—

1. The combination of the moldboard, the share attached to the front portion of the moldboard and projecting to the side thereof, and the tines extending longitudinally at the side of the rear portion of the moldboard and secured with their front ends to the rear portion of the share.

2. The combination of the moldboard, the share attached to the front portion of the moldboard and projecting to the side thereof, and the tines extending longitudinally at the side of the rear portion of the moldboard and secured with their front ends to the rear portion of the share, said tines increasing in length from the moldboard outwardly.

3. The combination of the moldboard, the share attached to the front portion of the moldboard and projecting to the side thereof, said share being inclined downward in a transverse direction from the moldboard outward and the tines extending longitudinally at the side of the rear portion of the moldboard and secured with their front ends to the rear portion of the share, the tines being arranged at different heights, with the highest tine adjacent to the moldboard.

OLIVER CROMWELL CAMPBELL.

Witnesses:
GARBER A. NICHOLS,
A. SIDNEY CHAMPION.